(No Model.)

J. LANDAU, Jr.
CAR FENDER.

No. 589,660. Patented Sept. 7, 1897.

WITNESSES:

INVENTOR
J. Landau Jr.
BY
ATTORNEYS.

UNITED STATES PATENT OFFICE.

JOHN LANDAU, JR., OF BROOKLYN, NEW YORK.

CAR-FENDER.

SPECIFICATION forming part of Letters Patent No. 589,660, dated September 7, 1897.

Application filed June 7, 1897. Serial No. 639,730. (No model.)

*To all whom it may concern:*

Be it known that I, JOHN LANDAU, Jr., of Brooklyn, in the county of Kings and State of New York, have invented a new and Improved Car-Fender, of which the following is a full, clear, and exact description.

The object of the invention is to provide a new and improved car-fender which is simple and durable in construction and arranged to permit of conveniently removing the fender-basket from one end of the car to the other, and to allow sufficient yielding when an object is struck and passes into the basket to retain the object and prevent it from rebounding out of the fender before the car is brought to a standstill.

The invention consists principally of a spring-pressed lever-frame fulcrumed on the car-body and a basket removably hung on the said frame.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in both the figures.

Figure 1:
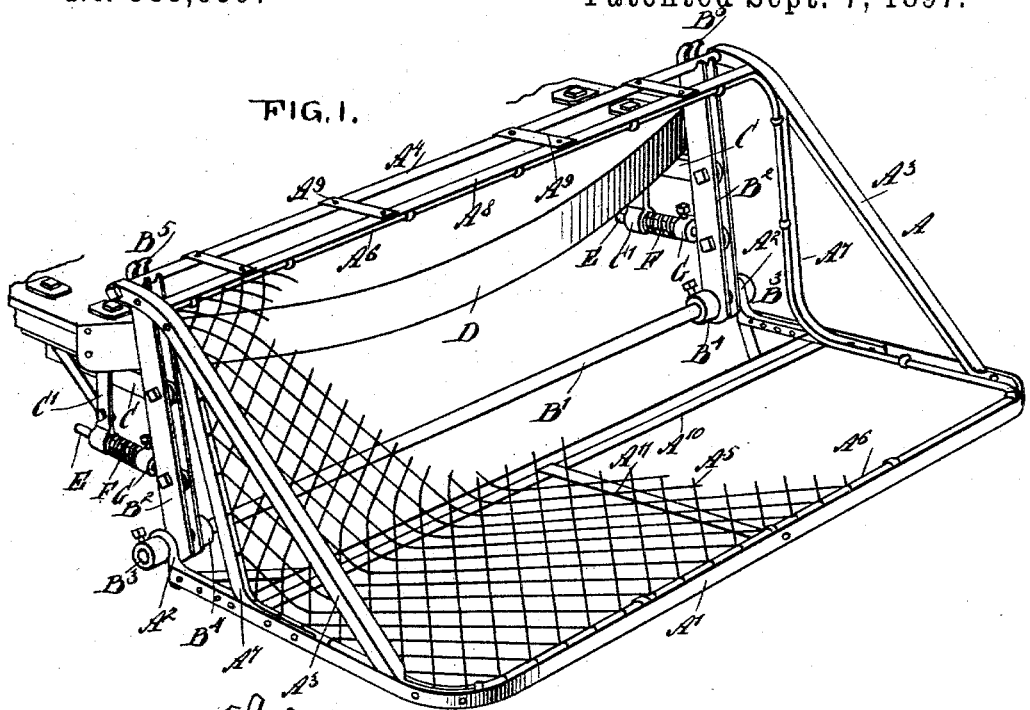
Figure 2:
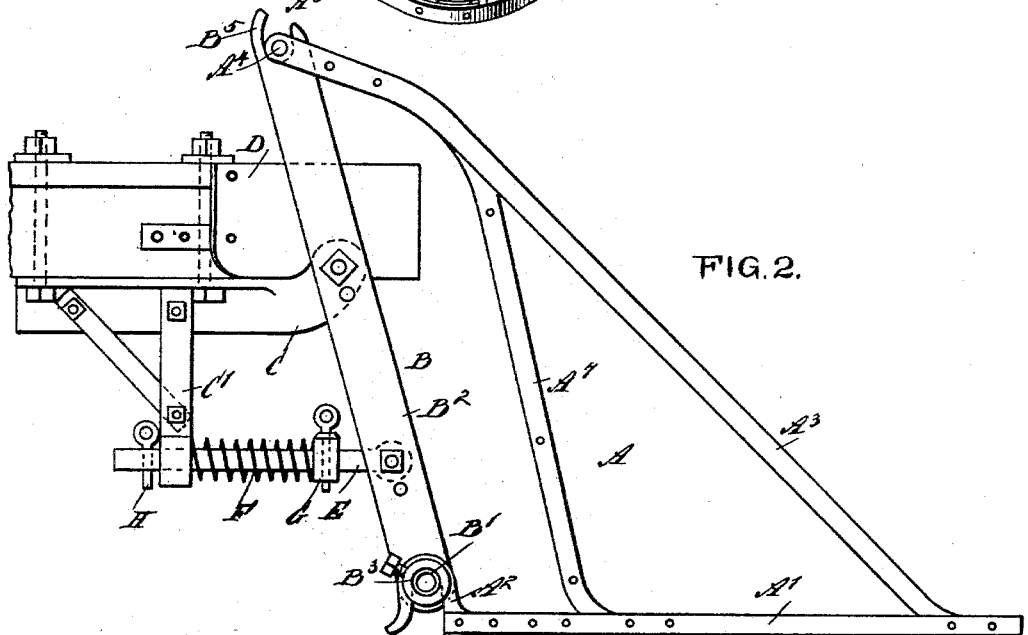

Figure 1 is a perspective view of the improvement with part of the basket-netting omitted, and Fig. 2 is an enlarged side elevation of the same.

The improved car-fender is provided with a basket A, removably hung on a lever-frame B, fulcrumed on brackets C, attached to the sides of the platform D of the car, the latter being provided at each end with such brackets and lever-frame, as only one basket A is used. This basket can be taken from one end of the car to the other and hung on the corresponding lever-frame.

The basket A is provided with a bottom frame A', preferably made U-shaped and formed at its rear ends with hooks $A^2$, adapted to be hooked upon a transversely-extending rod or tube B', held in the lower ends of the double side arms $B^2$ of the lever-frame B, as is plainly indicated in the drawings. The hooks $A^2$ are prevented from lateral movement in one direction by the arms $B^2$ and in an outward direction by collars $B^3$, secured by set-screws to the outer ends of the rods B', and the latter are prevented from lateral movement by collars $B^4$, secured by set-screws on the rod adjacent to the inner face of the arms $B^2$.

From the bottom of the frame A and from the sides thereof extend upwardly and rearwardly braces $A^3$, rigidly connected with each other at their upper rear ends by a transverse rod $A^4$, adapted to engage hooks $B^5$, formed on the upper ends of the side arms $B^2$ of the lever-frame, so that the entire basket A can be readily placed in position on the lever-frame by engaging the hooks $A^2$ with the rod B' and engaging the rod $A^4$ with the hooks $B^5$, and can be as readily removed from the lever-frame.

By reference to the drawings it will be seen that the hooks $A^2$ have their openings in a downward direction, while the hooks $B^5$ have their openings in an upward and somewhat forward direction, so that the basket A is not liable to become disconnected from the lever-frame B when the forward end of the frame A' strikes an object in the path of the car or the object passes into the basket.

The netting $A^5$ for the basket is secured to a frame $A^6$, bolted or otherwise secured to the inside of the frame A', the said netting $A^5$ also extending upwardly on the inside of braces $A^7$, connecting the sides of the frame $A^6$ with the braces $A^3$, the braces $A^3$ being connected with each other by the rod $A^8$, connected by braces $A^9$ with the rod $A^4$, as is plainly illustrated in Fig. 1. Thus the basket $A^5$ is open at the front and is partly closed on the sides by the braces $A^4$ and extends at the back upwardly from a cross-bar $A^{10}$ to the frame-rod $A^6$ under the rod $A^8$. The cross-bar $A^{10}$ is connected by a longitudinal bar $A^{11}$ with the front end of the frame A' at or near the middle thereof, as is plainly shown, so that the weight of the object passing into the basket does not unduly strain the netting.

The side arms $B^2$ of the frame B are each pivotally connected with a rod E, extending rearwardly and fitted to slide at its rear end in a bearing formed on a bracket C', depending from the bracket C. A spring F is coiled on each rod E and rests with one end on the said bearing and with its other end on a collar G, secured to the rod E. By the arrangement described the spring F will hold the side bars B², and consequently the entire frame B, in a slightly-inclined position, as shown in Fig. 2, and at the same time allow the lower end of the frame to swing rearwardly against the tension of the springs F. The outer sliding motion of the rods E is limited by pins H, held in the rods at the rear of the bearings in the bracket C', as plainly indicated in Fig. 1.

It will be seen that by the arrangement described the basket A can be readily lifted from the lever-frame B and taken to the other end of the car and placed in the lever-frame at this end of the car when the latter is on the return or home trip.

It will further be seen that the basket readily yields with the frame B when an object is struck by the frame and passes into the basket, so that rebounding of the object out of the basket is entirely prevented. The entire car-fender is very simple and durable in construction and is not liable to get out of order.

Having thus described my invention, I claim as new and desire to secure by Letters Patent—

1. A car-fender comprising a lever-frame, having its side arms fulcrumed on brackets attached to the car-body, rods pivotally connected with the side arms of the said frame, springs pressing on the said rods, and a basket having a frame arranged for removable connection with the said lever-frame, substantially as shown and described.

2. A car-fender comprising a lever-frame fulcrumed on the car-body, and having side arms formed at their upper ends with hooks, and a basket having a frame provided with hooks adapted to be hooked upon the said lever-frame, the said basket-frame being adapted to engage the hooks on the side arms of the said lever-frame, the hooks of the basket-frame having their openings in a downward direction and the hooks on the lever-frame being at the upper ends of the side arms, and having their openings upwardly and forwardly, substantially as shown and described.

JOHN LANDAU, JR.

Witnesses:
 THEO. G. HOSTER,
 JNO. M. RITTER.